United States Patent [19]

Shinzawa et al.

[11] Patent Number: 5,024,194
[45] Date of Patent: Jun. 18, 1991

[54] FLAME DISPERSION ARRANGEMENT FOR SWIRL CHAMBER TYPE DIESEL ENGINE PISTON CROWN

[75] Inventors: Motohiro Shinzawa, Yokosuka; Yoshiki Sekiya, Yokohama, both of Japan

[73] Assignee: Nissan Motor Company, Ltd. Yokohama, Japan

[21] Appl. No.: 549,033

[22] Filed: Jul. 6, 1990

[30] Foreign Application Priority Data

Jul. 10, 1989 [JP] Japan .................................. 1-177766
Jul. 10, 1989 [JP] Japan .................................. 1-177767

[51] Int. Cl.⁵ .............................................. F02F 3/24
[52] U.S. Cl. ...................................... 123/269; 123/279
[58] Field of Search ............... 123/269, 279, 262, 263, 123/289, 290, 275

[56] References Cited

U.S. PATENT DOCUMENTS

| | | | |
|---|---|---|---|
| 3,196,857 | 7/1965 | Zimmermann | 123/269 |
| 3,965,872 | 6/1976 | Iaira et al. | 123/269 |
| 4,237,827 | 12/1980 | Hamai | 123/269 |
| 4,662,330 | 5/1987 | Shioyama et al. | 123/269 |
| 4,785,776 | 11/1988 | Tokura et al. | 123/269 |

Primary Examiner—Raymond A. Nelli
Attorney, Agent, or Firm—Pennie & Edmonds

[57] ABSTRACT

Wall surfaces which define essentially circular recesses are constructed to deflect the flow of burning gases from a swirl chamber in a manner to either tighten the swirl formed therein or to improve the initial splitting of the frame in a manner which increases the amount of gases which are induced to undergo swirling in the recesses.

7 Claims, 5 Drawing Sheets

FLAME DISPERSION ARRANGEMENT FOR SWIRL CHAMBER TYPE DIESEL ENGINE PISTON CROWN

RELATED APPLICATIONS

U.S. Pat. No. 4,785,776 issued on Nov. 22, 1988, in the name of Tokura et al.

U.S. Pat. No. 4,881,501 issued on Nov. 21, 1989, in the name of Shinzawa et al.

U.S. Pat. appliction Ser. No. 07/505,072 filed on Apr. 5, 1990, in the name of Motohiro Shinzawa.

BACKGROUND OF THE INVENTION

1. Field of the Invention

The present invention relates generally to a swirl type diesel engine and more specifically to such a diesel engine wherein the crown of the piston is formed with a two stage flame splitting/swirl inducing arrangement which improves dispersion and mixing of flame which is ejected from the swirl chamber.

2. Description of the Prior Art

FIG. 1 shows a so called "clover leaf" type flame dispersing cavity or recess arrangement 1 which is used in combination with a swirl or prechamber type diesel engine of the nature disclosed in JP-A-54-59512, JU-A-50-138403 and JU-A-57-78724.

With this type of engine, in order to lower the peak combustion temperature in the swirl chamber 2 and thus reduce the amount of NOx produced, a fraction of the fuel which is injected thereinto is released into the main combustion chamber prior spontaneous combustion of the main air-fuel charge in the swirl chamber.

However, in the absence of any strong turbulence or other mixing influence in the main combustion chamber, most of the fuel which is permitted to escape into the main combustion chamber via a transfer passage 3 tends to remain in or close to the trench portion 4 of the cavity. As the cavity 1 exerts only a relatively weak dispersing influence on the flame which is ejected into the trench 4, it tends to flow up and over the rounded nose portion 5 of the clover leaf type dispersion recess located opposite the trench. This induces the situation wherein the fuel droplets in the trench tend to be entrained in a flame plume P having a shape essentially as illustrated in broken line.

Under these conditions, the fuel which is released into the main combustion chamber tends to be carried by the initial flame ejection into a relatively cool section thereof wherein quenching of the flame is apt occur.

Accordingly, the relatively rich flame and the entrained fuel (particularly the latter) are not mixed effectively with the air which is available in the main combustion chamber and neither tend to undergo sufficiently rapid nor complete combustion to enable good engine output and low noxious emissions.

As a result of this problem, during low load engine operation high HC emissions result while under higher loads smoke formation tends to exceed acceptable limits.

SUMMARY OF THE INVENTION

It is an object of the present invention to provide an arrangement which promotes improved mixing of the flame which ejects via the transfer port from the swirl chamber and mixing with the air and/or fuel which is remnant in the main combustion chamber in a manner which promotes more efficient combustion and thus reduces smoke and HC emissions.

In brief, the above object is achieved by an arrangement wherein wall surfaces which define essentially circular recesses are constructed to deflect the flow of burning gases from a swirl chamber in a manner to either tighten the swirl formed therein or to improve the initial splitting of the flame in a manner which increases the amount of gases which are induced to undergo swirling in the recesses.

More specifically, the present invention is deemed to take the form of a internal combustion engine which features: a piston reciprocatively disposed in a bore in a manner which defines a variable volume combustion chamber; a swirl chamber, said swirl chamber being fluidly communicated with the combustion chamber by a transfer port, said piston comprising: an essentially flat crown; a shaped cavity formed in said crown, said cavity being in part bounded by first and second opposed walls; an island-like flame deflecting projection, said island-like flame deflecting projection comprising a member which projects up from the floor of said cavity and which is arranged in the path of the flame which ejects from said transfer passage during the expansion phase of the engine and when the piston is close to its TDC position; said first wall being arranged to have first and second guide portions, said first and second guide portions extending inwardly toward one of the center of the piston crown or the island-like flame deflecting projection, said first wall further comprising a first curved section which merges with said first and second guide portions, said first and second guide portions and said curved portion defining in part a first flame dispersion zone in said cavity, said first curved wall portion being so constructed and arranged as to deflect a portion of the flame which flows theretoward and which promotes mixing of the flame with the air contained in said first flame dispersing zone; second and third concavely curved wall portions formed in said first wall, said second and third wall portions being formed in said first wall at locations outboard of said first and second guide portions, respectively; fourth and fifth concavely curved wall portions formed in said second wall, said fourth and fifth wall portions cooperating to define a nose portion which projects into said cavity, said nose portion being arranged in the path of the flame which ejects from said transfer passage after said piston descends from its TDC position by a predetermined amount, said fourth and fifth wall portions further cooperating with said second and third curved wall portions of said first wall in a manner to define second and third essentially circular flame dispersing zones in which spiralling flows are established; and means embodied in the construction of said shaped cavity for modifying the spiralling characteristics of the spiralling flows in said second and third flame dispersing zones in a manner which improves combustion characteristics.

DETAILED DESCRIPTION OF THE PREFERRED EMBODIMENTS

Figure 1:
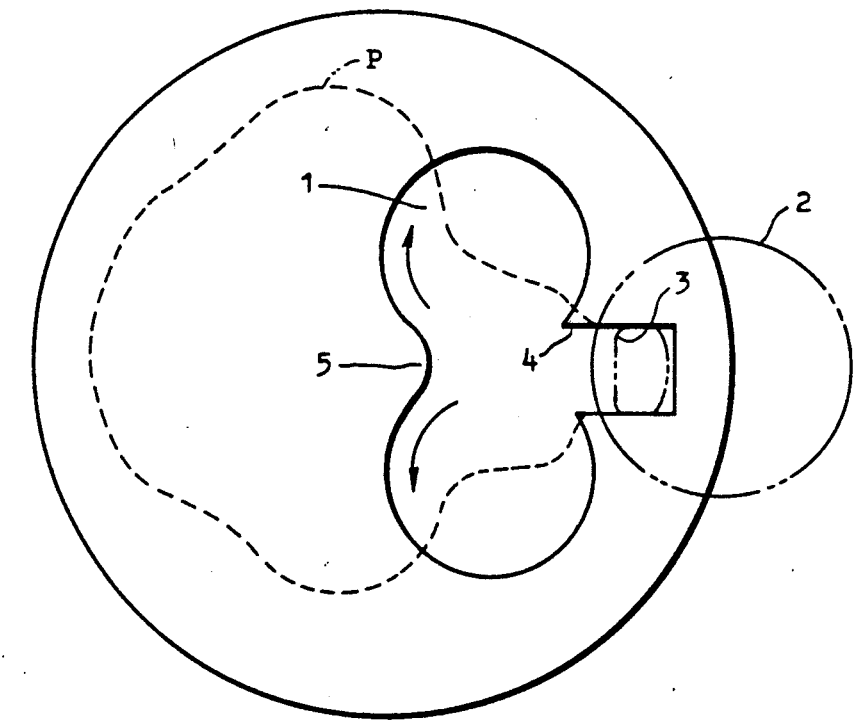
FIGS. 1 and 2 show the prior art arrangement discussed in the opening paragraphs of the instant disclosure.
Figure 2:
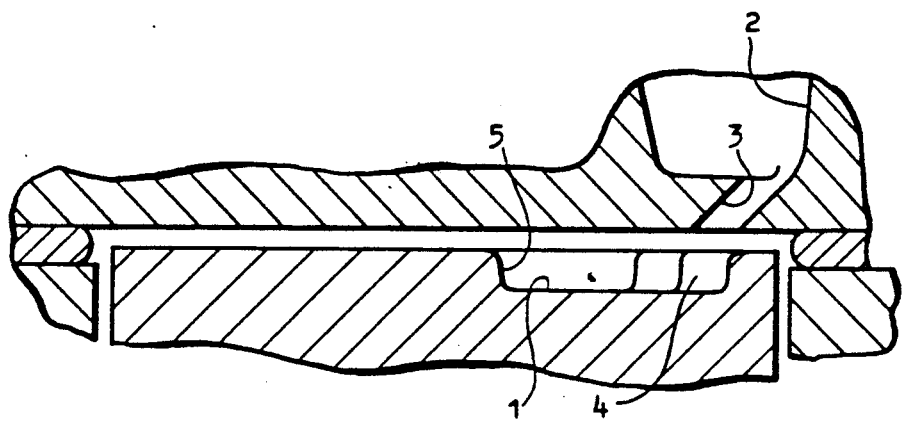
Figure 3:
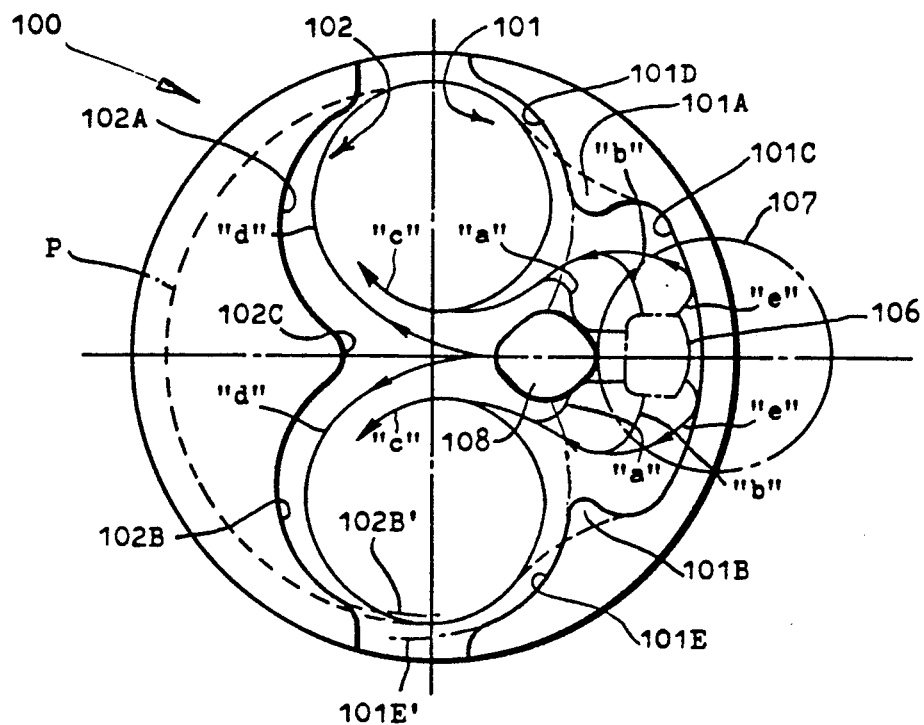
FIGS. 3 and 4 show a first embodiment of the present invention.
Figure 4:
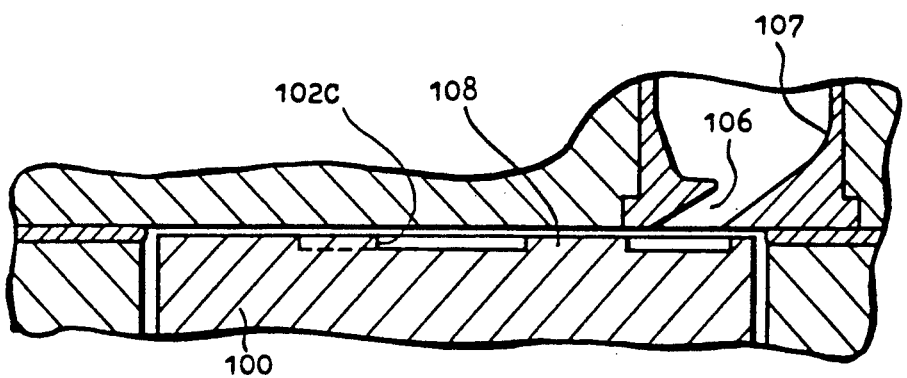

FIGS. 3 and 4 shows a swirl chamber type diesel engine according to a first embodiment of the the present invention. In this arrangement the piston 100 is formed with a shaped flame dispersing cavity in the crown thereof. The cavity is defined between two opposed shaped walls 101 and 102 and is relatively shallow as compared with the prior art arrangement shown in FIGS. 1 and 2. The depth of this dispersion recess is limited to reduce the loss in compression ratio.

Portions of the first wall 101 which flank a first flame dispersion zone where the flame from a transfer passage 106 which leads from a swirl chamber 107 to the main combustion chamber, are arranged to define two essentially inwardly directed nose-like guide portions or fingers 101A and 101B. In this embodiment the fingers are relatively blunt.

A wall portion 101C which extends between the two guide portions is arranged to have a curvature which approximately parallels the periphery of the piston 100. As will be noted the first flame dispersing zone has an essentially bay-like configuration.

Curved wall portions 101D, 101E of the first wall and 102A and 102B of the second wall are arranged to define therebetween second and third essentially circular and mirror image dispersion zones.

As shown in FIG. 3 the instant embodiment the wall portions 102A and 102B are arranged such that the extrapolations thereof pass inboard of the extrapolation of wall portions 101E and 101D. Viz., as illustrated in the lower half of this figure, the extrapolation 102B' of wall portion 102B passes inboard of the extrapolation 101E' of the wall portion 101E. Further, the inwardly extending extrapolations 101E' and 101D' of the wall portions 101E and 101D are such as to intersect essentially mid portions of a single islandlike deflection portion 108 which is located amid the the first, second and third flame dispersion zones.

This island 108, as it will be referred to hereinafter, is arranged to project up from the floor of the cavity at a site which located in the mouth of the bay-like first flame dispersing zone and located on a line A which extends diametrically across the piston crown and with respect to which the second and third flame dispersing zones are symmetrically arranged.

The transfer passage 106 is oriented so that this deflection portion 108 is arranged in the path of the flame which is ejected therefrom during the initial stage of the expansion phase while the piston 100 is still relatively close to its TDC position.

The upstream face of the deflection portion or island 108, is arranged to have angled sides which face into the flame and which are designed to induce a first splitting or division of the same. These two sides define a first angle.

A second flame splitting of deflecting portion is defined by a V-shaped nose portion 102C which forms part of the second wall 102 and which projects into the cavity in a manner which tends to separate the second and third circular dispersion zones. The sides of the nose are arranged to define a second angle. In this instance the first angle is larger than the second one.

It will be noted that the second and third zones of the cavity are open and extend to the very perimeter of the piston crown in the illustrated manner.

For disclosure relating generally to this type of cavity, reference may be had to U.S. Pat. No. 4,662,330 issued on May 5, 1987 in the same of Giichi Shiyoyama et al.

The operation of the above described arrangement is such that while the piston is close to TDC, the major portion of the flame which passes through the transfer portion 106 during the expansion phase of the engine, flows toward and impinges on the island 108 as shown by the flow lines "a". This induces a first splitting of the flame and causes the divided parts to encounter portions of the flame which have spread almost laterally outward from the transfer port and which are flowing along flow lines "b".

Portions of the flame which tend to flow back away from the island 108 as indicated by flow lines "e" are deflected by the wall portion 101C in a manner wherein they tend to curl back and blend with the flows "a" and "b".

The blended flows are subject to deflection by the guide fingers 101A and 101B in a manner they pass through the openings defined between the island 108 and the fingers and assume a flow indicated by flow lines "c". This blending process tends to engulf most of the air which is present in the first flame dispersion zone and thus promote desirable combustion characteristics during the initial stage of the expansion phase.

As the piston 100 descends, the location where the flame from the transfer port 106 impinges on the piston crown travels from a site upstream of the island 108, over the top of the same into the region defined between the island 108 and the nose 102C. Thus, upon a given amount of decent of the piston 100, the flame passes over the top of the island 108 and is subject to a second division or splitting by the nose 102C. This splitting produces swirling flows which blend into the flows established by the first splitting and result in the formation of contra-rotating swirling flows indicated by the flow lines "d".

In this embodiment the curvature of the swirl which is induced by the deflection of wall portions 102A and 102B tend to be tighter than that induced by the deflection by wall portions 101E and 101D.

This dual stage splitting of the flame tends to produce an extensive and well developed plume of the nature generally inducted by the broken line and which results a considerable amount of the air which is resident in the main combustion chamber at this time, being engulfed by the flame. This results in the fraction of the fuel which is permitted to escape into the main combustion chamber prior the beginning of the expansion phase being entrained in the burning gases which constitute the flame which is ejected from the transfer port 106 in a manner which promotes efficient combustion.

This reduces HC emissions during low load operation and reduces smoke formation under high loads.

SECOND EMBODIMENT

Figure 5:
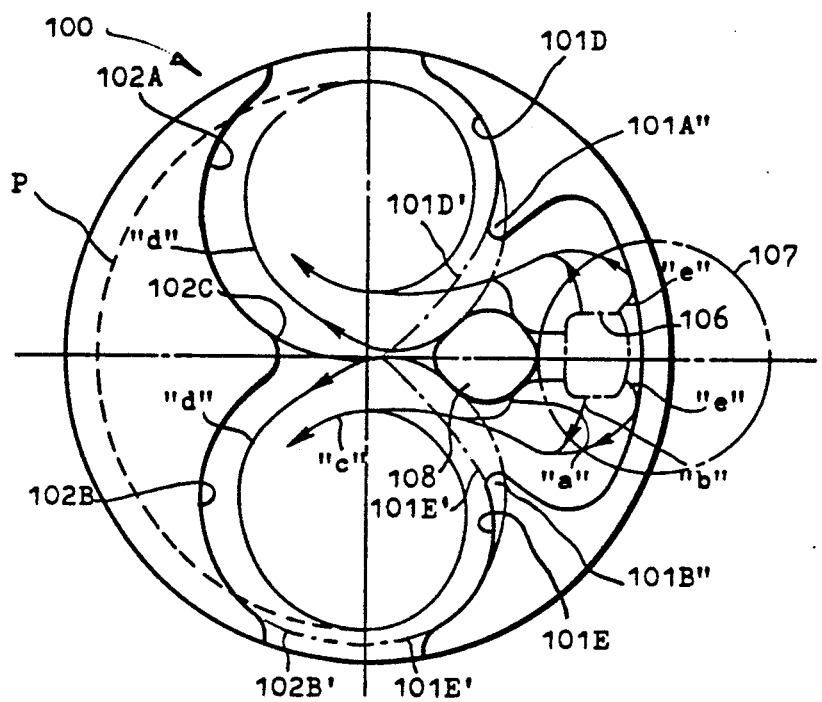
FIG. 5 is a plan view which shows a second embodiment of the present invention.

FIG. 5 shows a second embodiment of the present invention. In this embodiment the guide portions or fingers 101A" and 101B" are longer and sharper in configuration as compared with those of the first embodiment. The extrapolations of the walls 101E and 101D are such as to miss the island 108 and intersect with one another proximate the center of the piston crown. On the other hand, the curvature of the wall portions 102A and 102B are such as to tend to merge with the extrapolations of the wall portions 101E and 101D respectively. The deflection of flows "c" therefore tends to be more toward the center of the piston crown than in the case of the first embodiment while the curvature of the flows "d" tends to be tightened by the elongated guide fingers 101A" and 101B". This tends to improve the characteristics of the swirls which are generated and efficiency with which the remnant air in the main combustion chamber is utilized.

THIRD EMBODIMENT

Figure 6:
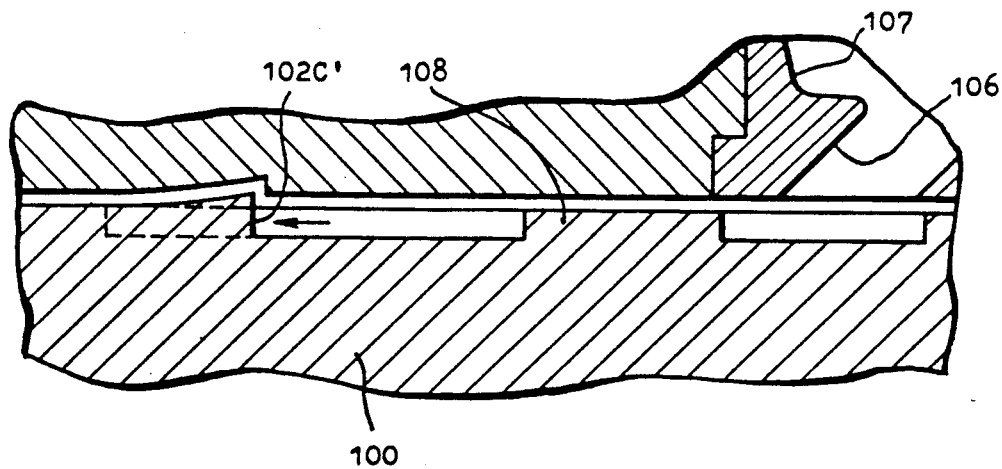
FIGS. 6 and 7 show a third embodiment of the present invention.
Figure 7:
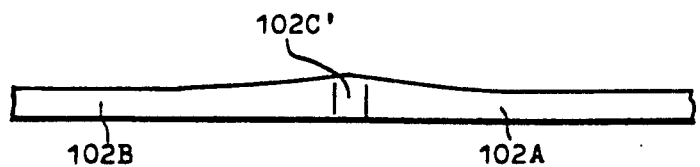

FIGS. 6 and 7 show the construction which characterizes a third embodiment of the present invention. In this arrangement the nose portion 102C' is arranged to be higher than the remainder of the piston crown. The lower face of the cylinder head is recessed in a manner to receive the elevated nose portion when the piston reaches TDC. With this construction, the height of the wall against which the flame impinges and is split into two flows is increased. This results in the efficiency with which the flame is split into two flows is increased and tendency for the flame to ride up over the same, reduced. This feature both improves the swirl formation and improves high load operation wherein the velocity of the flame and the tendency for the flame to flow over the nose, are higher than in the case of low-medium load operation.

By recessing the cylinder head in a manner to admit the upwardly projecting nose portion, any loss in compression ratio is offset.

FOURTH EMBODIMENT

Figure 8:
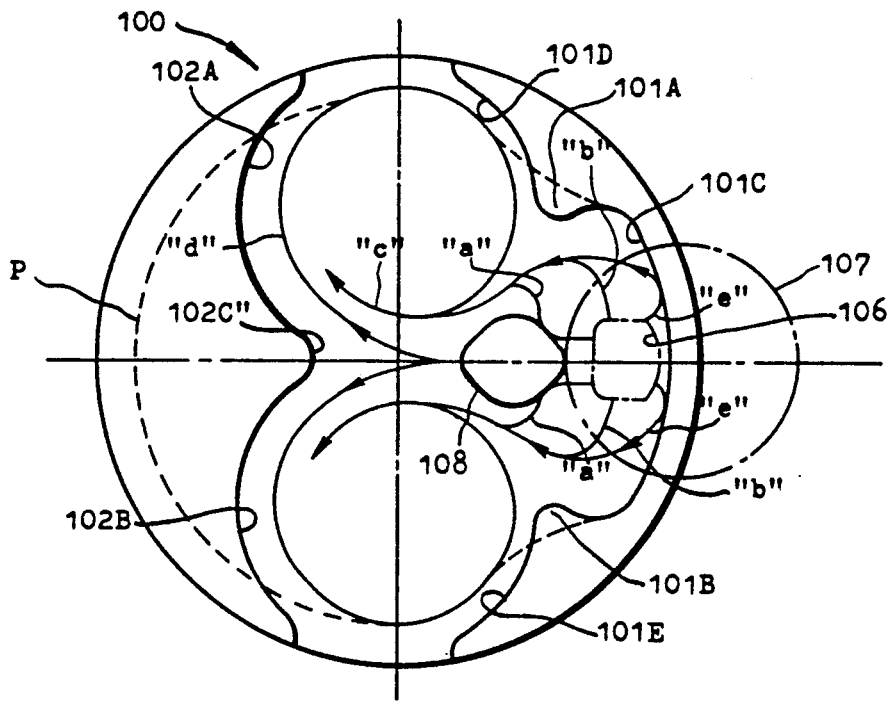
FIG. 8 and 9 show a fourth embodiment of the present invention.
Figure 9:
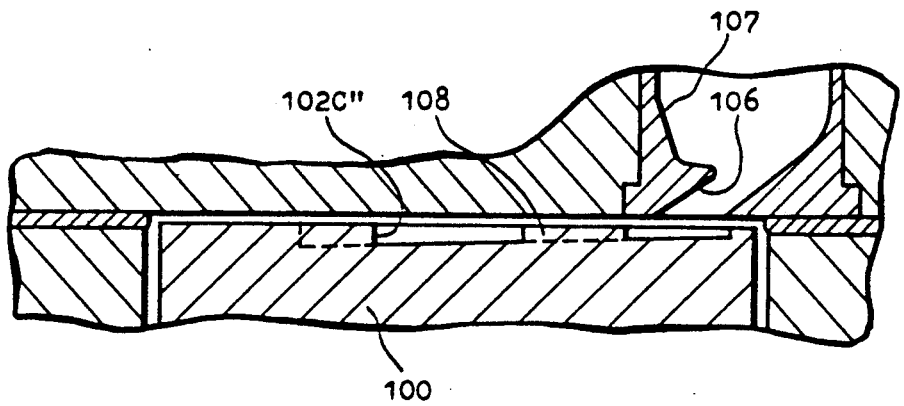

FIGS. 8 and 9 show a fourth embodiment of the present invention. In this embodiment the depth of the flame dispersing cavity increases from the first wall 101 toward the second wall 102. In this arrangement, the depth of the cavity at the first wall end is less than in the case of the first embodiment which exhibits a uniform depth, and increase to a maximum depth at the second wall. This increases the height of the wall defined at the nose 102C and thus provides advantages similar to those derived with the arrangement shown in FIGS. 6 and 7.

In this particular embodiment, the extrapolations of the wall portions 102A, 102B, 101E, and 101D are such that the guide or finger portions 101A and 101B are blunt and the curvature of the first wall portions 101E and 101D such that the inwardly extending extrapolations intersect the island 108 while the outwardly extending ones tend to merge with those from the wall portions 102A and 102B.

It will of course be understood that the first and second wall portions 101, 102 could be arranged such that the first wall portion is constructed in the manner as shown in FIG. 5 while the second wall portion be arranged in the manner shown in FIG. 3 without deviating from the scope of the present invention.

FIFTH EMBODIMENT

Figure 10:
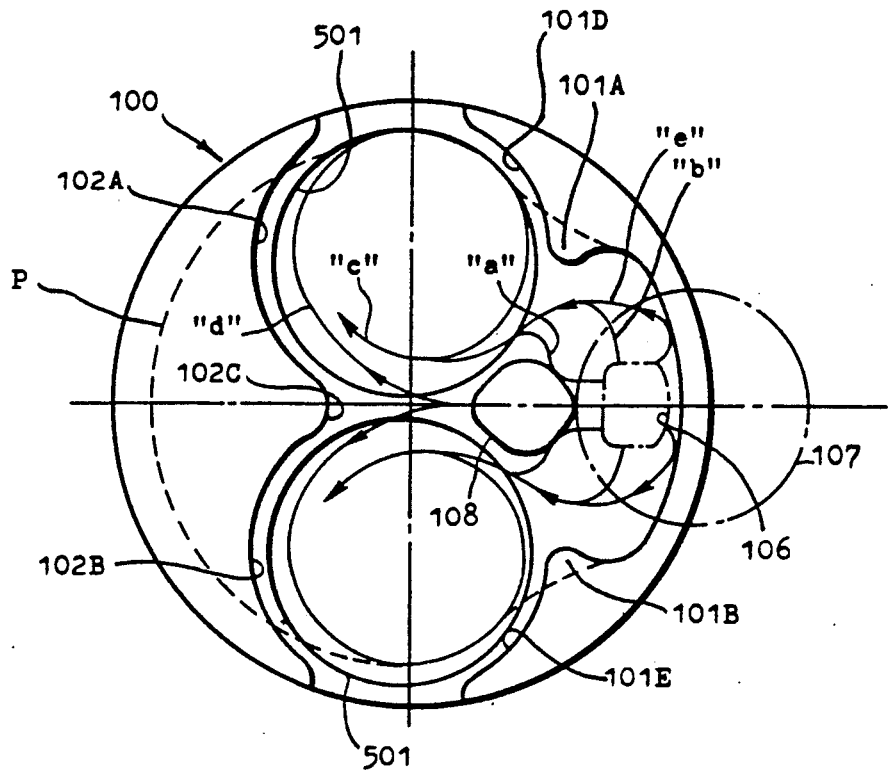
FIGS. 10 and 11 show a fifth embodiment of the present invention.
Figure 11:
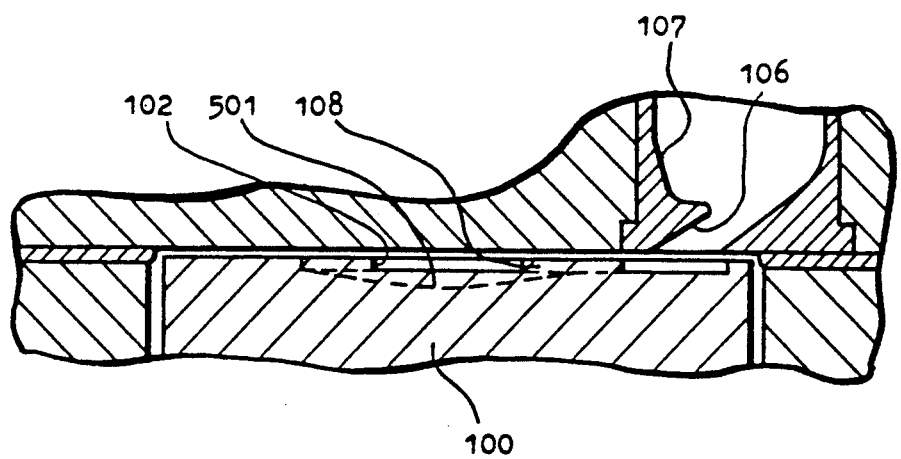

FIGS. 10 and 11 show a fifth embodiment of the present invention. In this arrangement concave dished recesses 501 are formed in the second and third flame dispersing zones. These recesses 501 are such as to increase the strength which which the swirling of the gases in the second and third dispersion zones takes place and thus improves the efficiency with which the air remnant in the combustion chamber can be used. Viz., the gradually increasing depth of the recesses 501 is such as to tend to tighten the curvature of the swirling patterns which are established following the second flame splitting on the nose 102C and thus improve the mechanism with which the flame mixes with the remaining air. The depth of the flame dispersing cavity is other than the sites of the recesses 510, uniform.

In this embodiment the configuration of the first and second walls 101, 102 is such that the curvatures are essentially the same as that shown in FIG. 8. However, here again it not outside of the scope of the present invention to modify the same in a manner which combines one or more of the features of the first and second embodiments with the recesses and/or tapered type dispersing cavity.

What is claimed is:
1. In an internal combustion engine
   a piston reciprocatively disposed in a bore to define a variable volume combustion chamber;
   a swirl chamber, said swirl chamber being fluidly communicated with the combustion chamber by a transfer port, said piston comprising:
   an essentially flat crown;
   a shaped cavity formed in said crown, said cavity being in part bounded by first and second opposed walls;
   an island-like flame deflecting projection, said island-like flame deflecting projection comprising a member which projects up from the floor of said cavity and which is arranged in the path of the flame which ejects from said transfer passage during the expansion phase of the engine and when the piston is close to its TDC position;
   said first wall being arranged to have first and second guide portions, said first and second guide portions extending inwardly toward one of the center of the piston crown or the island-like flame deflecting projection, said first wall further comprising a first curved section which merges with said first and second guide portions, said first and second guide portions and said curved portion defining in part a first flame dispersion zone in said cavity, said first curved wall portion being so constructed and arranged as to deflect a portion of the flame which flows theretoward and which promotes mixing of the flame with the air contained in said first flame dispersing zone;
   second and third concavely curved wall portions formed in said first wall, said second and third wall portions being formed in said first wall at locations outboard of said first and second guide portions, respectively;
   fourth and fifth concavely curved wall portions formed in said second wall, said fourth and fifth wall portions cooperating to define a nose portion which projects into said cavity, said nose portion being arranged in the path of the flame which ejects from said transfer passage after said piston descends from its TDC position by a predetermined amount, said fourth and fifth wall portions further cooperating with said second and third curved wall portions of said first wall in a manner to define second and third essentially circular flame dispersing zones in which spiralling flows are established; and means embodied in the construction of said shaped cavity for modifying the spiralling characteristics of the spiralling flows in said second and third flame dispersing zones in a manner which improves combustion characteristics.

2. An internal combustion engine as claimed in claim 1 wherein said spiral flow modifying means comprises: means for one of tightening the swirl formed therein and to improve the initial splitting of the flame on the nose portion in a manner which increases the amount of gases which are induced to undergo swirling in the recesses.

3. An internal combustion engine as claimed in claim 1 wherein said spiral flow modifying means comprises: said fourth and fifth wall curved portions curve concavely in a manner wherein the extrapolations thereof pass inboard of the extrapolations of said second and third curved wall portions, said fourth and fifth wall portions thus being arranged to deflect the spiralling flows in the second and third flame dispersing zones in a manner such that they tend to flow into a tightening swirl pattern.

4. An internal combustion engine as claimed in claim 1 wherein said spiral flow modifying means comprises: said guide portions being elongate and oriented such that the inwardly extending extrapolation of said second and third wall portions intersect at a location proximate the center of the piston crown.

5. An internal combustion engine as claimed in claim 1 wherein said spiral flow modifying means comprises: said nose portion being so constructed and arranged to project above the level of said essentially flat crown and thus increase the area of the nose against which the flame impinges and is split into flows which tend to spiral in the second and third dispersion zones.

6. An internal combustion engine as claimed in claim 1 wherein said spiral flow modifying means comprises: the depth of said shaped cavity being arranged to increase from the first wall in the direction of said second wall and thus define a tapering arrangement which tends to increase the area of the nose against which the flame impinges and is split into flows which tend to spiral in the second and third dispersion zones.

7. An internal combustion engine as claimed in claim 1 wherein said spiral flow modifying means comprises: first and second dish-shaped concavities formed in the second and third flame dispersing zones respectively, the perimeter of said first and second dish-shaped concavities being arranged to proximate said first second walls.

* * * * *